(12) United States Patent
Lin et al.

(10) Patent No.: US 11,521,590 B2
(45) Date of Patent: Dec. 6, 2022

(54) HIGH-POWER ULTRASOUND EMITTER DESIGN

(71) Applicant: The Boeing Company, Chicago, IL (US)

(72) Inventors: John Z. Lin, Renton, WA (US); Wayne Cooper, Tacoma, WA (US); Kane M. Mordaunt, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 757 days.

(21) Appl. No.: 16/450,600

(22) Filed: Jun. 24, 2019

(65) Prior Publication Data

US 2020/0402495 A1  Dec. 24, 2020

(51) Int. Cl.
| | |
|---|---|
| G10K 13/00 | (2006.01) |
| B01D 19/02 | (2006.01) |
| B01D 19/00 | (2006.01) |
| B06B 1/02 | (2006.01) |
| G01N 29/34 | (2006.01) |
| G01N 29/22 | (2006.01) |

(52) U.S. Cl.
CPC ......... *G10K 13/00* (2013.01); *B01D 19/0078* (2013.01); *B01D 19/02* (2013.01); *B06B 1/0269* (2013.01); *G01N 29/221* (2013.01); *G01N 29/346* (2013.01); *G01N 29/348* (2013.01)

(58) Field of Classification Search
CPC  B01D 19/0078; B01D 19/02; B01D 19/0094; B06B 1/0269; B06B 3/04; G10K 13/00; G01N 29/346; G01N 29/348; G01N 29/221

See application file for complete search history.

(56) References Cited

U.S. PATENT DOCUMENTS

| | | | |
|---|---|---|---|
| 5,299,175 A | 3/1994 | Gallego-Juarez et al. | |
| 7,719,924 B2 * | 5/2010 | Gallego Juarez | G10K 13/00 367/140 |

FOREIGN PATENT DOCUMENTS

EP  0327486  8/1989

OTHER PUBLICATIONS

Rodriguez-Corral, Focused High-power Ultrasonic Transducer with Stepped-plate Radiator for Industrial Application in Gases, Ultrasonics International 87 Conference Proceedings, Jul. 1987, pp. 794-799, London, UK.

Rodriguez, Industrial Requirements in High-Power Ultrasonic Transducers for Defoaming, 19th International Congress on Acoustics, Sep. 2007, pp. 1-6, Madrid, Spain.

* cited by examiner

*Primary Examiner* — Brian Ensey
(74) *Attorney, Agent, or Firm* — Kunzler Bean & Adamson (57) ABSTRACT

Disclosed herein a method of producing an ultrasound that includes defining a set of criteria for an ultrasound emitter comprising a plate. The set of criteria includes a power output criterion, a frequency criterion and number of nodes for a resonance mode of the plate, a focus criterion, and a durability criterion. The method includes determining an outline and a thickness range for the plate, based on the set of criteria. The method includes using topology optimization to determine internodal zone dimensions for the plate, based on the set of criteria, the outline, and the thickness range. The method includes manufacturing the plate according to the internodal zone dimensions.

20 Claims, 5 Drawing Sheets

HIGH-POWER ULTRASOUND EMITTER DESIGN

FIELD

This disclosure relates generally to ultrasound emitters, and more particularly, to high-power ultrasound emitter design.

BACKGROUND

Ultrasound is used for a variety of purposes, such as for cleaning, defoaming, and non-destructive inspection. Vibration of an ultrasound emitter, driven by an ultrasonic transducer, may displace a medium such as air, another gas, or a liquid to produce ultrasound waves in the medium. However, fatigue failure may occur rapidly in high-power ultrasound emitters, due to rapid cycling at frequencies of tens of kilohertz or higher. At high power or sound pressure levels, fatigue failure becomes increasingly likely.

SUMMARY

The subject matter of the present application has been developed in response to the present state of the art, and in particular, in response to the shortcomings of previous ultrasound emitter designs that have not yet been fully solved by the currently available techniques. Accordingly, the subject matter of the present application has been developed to provide an ultrasound emitter and associated design method and computer program product that overcome at least some of the above-discussed shortcomings of previous techniques. More specifically, in some examples, the ultrasound emitter of the present disclosure can provide greater power output and/or durability compared to previous ultrasound emitter designs.

Disclosed herein is a method of producing an ultrasound emitter that includes defining a set of criteria for an ultrasound emitter comprising a plate. The set of criteria includes a power output criterion, a frequency criterion and number of nodes for a resonance mode of the plate, a focus criterion, and a durability criterion. The method includes determining an outline and a thickness range for the plate, based on the set of criteria. The method includes using topology optimization to determine internodal zone dimensions for the plate, based on the set of criteria, the outline, and the thickness range. The method includes manufacturing the plate according to the internodal zone dimensions. The preceding subject matter of this paragraph characterizes example 1 of the present disclosure.

The method includes determining plate dimensions based on the internodal zone dimensions and a fillet radius for interior corners. The method includes performing frequency response analysis based on the plate dimensions to determine whether the plate dimensions meet the frequency criterion and the durability criterion, prior to manufacturing the plate. The preceding subject matter of this paragraph characterizes example 2 of the present disclosure, wherein example 2 also includes the subject matter according to example 1, above.

The method includes performing air-coupled analysis based on the plate dimensions to determine whether the plate dimensions meet the power output criterion and the focus criterion, prior to manufacturing the plate. The preceding subject matter of this paragraph characterizes example 3 of the present disclosure, wherein example 3 also includes the subject matter according to example 2, above.

Manufacturing the plate is in response to determining that the plate dimensions meet the criteria. The preceding subject matter of this paragraph characterizes example 4 of the present disclosure, wherein example 4 also includes the subject matter according to example 3, above.

In response to determining that at least one of the criteria is unmet, the method includes iteratively using topology optimization to modify internodal zone dimensions, performing frequency response analysis, and performing air-coupled analysis until the plate dimensions meet the criteria. The preceding subject matter of this paragraph characterizes example 5 of the present disclosure, wherein example 5 also includes the subject matter according to example 3, above.

The plate includes a titanium alloy and the durability criterion is based on a yield strength for the titanium alloy. The preceding subject matter of this paragraph characterizes example 6 of the present disclosure, wherein example 6 also includes the subject matter according to any one of examples 1-5, above.

Using topology optimization to determine the internodal zone dimensions includes reducing a mass for the plate and increasing a displacement for at least one internodal zone, compared to a flat-plate model. The preceding subject matter of this paragraph characterizes example 7 of the present disclosure, wherein example 7 also includes the subject matter according to any one of examples 1-6, above.

The power output criterion includes a sound pressure level of at least 173 decibels at a focal point. The preceding subject matter of this paragraph characterizes example 8 of the present disclosure, wherein example 8 also includes the subject matter according to any one of examples 1-7, above.

The frequency criterion includes a resonant frequency in a range from 19.8 kHz to 20.2 kHz, inclusive. The preceding subject matter of this paragraph characterizes example 9 of the present disclosure, wherein example 9 also includes the subject matter according to any one of examples 1-8, above.

The frequency criterion includes a resonant frequency in a range from 200 kHz to 400 kHz, inclusive. The preceding subject matter of this paragraph characterizes example 10 of the present disclosure, wherein example 10 also includes the subject matter according to any one of examples 1-8, above.

The internodal zone dimensions include internodal zone heights defining steps. at internodal zone boundaries. The preceding subject matter of this paragraph characterizes example 11 of the present disclosure, wherein example 11 also includes the subject matter according to any one of examples 1-10, above.

Also disclosed herein is a computer program product for producing an ultrasound emitter. The computer program product includes a computer readable storage medium having program code embodied therein. The program code is readable/executable by a processor. The program code is configured for defining a set of criteria for an ultrasound emitter shaped as a plate. The set of criteria includes a power output criterion, a frequency criterion and number of nodes for a resonance mode of the plate, a focus criterion, and a durability criterion. The program code is configured for determining an outline and a thickness range for the plate, based on the criteria. The program code is configured for using topology optimization to determine internodal zone dimensions for the plate, based on the criteria, the outline, and the thickness range. The program code is configured for manufacturing the plate according to the internodal zone dimensions. The preceding subject matter of this paragraph characterizes example 12 of the present disclosure.

The program code is configured for determining plate dimensions based on the internodal zone dimensions and a fillet radius for interior corners. The program code is configured for performing frequency response analysis based on the plate dimensions to determine whether the plate dimensions meet the frequency criterion and the durability criterion, prior to manufacturing the plate. The preceding subject matter of this paragraph characterizes example 13 of the present disclosure, wherein example 13 also includes the subject matter according to example 12, above.

The program code is configured for performing air-coupled analysis based on the plate dimensions to determine whether the plate dimensions meet the power output criterion and the focus criterion, prior to manufacturing the plate. The preceding subject matter of this paragraph characterizes example 14 of the present disclosure, wherein example 14 also includes the subject matter according to example 13, above.

The program code is configured for manufacturing the plate in response to determining that the plate dimensions meet the criteria. The preceding subject matter of this paragraph characterizes example 15 of the present disclosure, wherein example 15 also includes the subject matter according to example 14, above.

The program code is configured, in response to determining that at least one of the criteria is unmet, for iteratively using topology optimization to modify internodal zone dimensions, performing frequency response analysis, and performing air-coupled analysis until the plate dimensions meet the criteria. The preceding subject matter of this paragraph characterizes example 16 of the present disclosure, wherein example 16 also includes the subject matter according to any one of examples 14-15, above.

The plate includes a titanium alloy and the durability criterion is based on a yield strength for the titanium alloy. The preceding subject matter of this paragraph characterizes example 17 of the present disclosure, wherein example 17 also includes the subject matter according to any one of examples 12-16, above.

Using topology optimization to determine the internodal zone dimensions includes reducing a mass for the plate and increasing a displacement for at least one internodal zone, compared to a flat-plate model. The preceding subject matter of this paragraph characterizes example 18 of the present disclosure, wherein example 18 also includes the subject matter according to any one of examples 12-17, above.

Also disclosed herein is an apparatus for ultrasound emission. The apparatus includes a plate produced by a method, where the method included defining a set of criteria for an ultrasound emitter comprising a plate. The set of criteria includes a power output criterion, a frequency criterion and number of nodes for a resonance mode of the plate, a focus criterion, and a durability criterion. The method includes determining an outline and a thickness range for the plate, based on the set of criteria. The method includes using topology optimization to determine internodal zone dimensions for the plate, based on the set of criteria, the outline, and the thickness range. The method includes manufacturing the plate according to the internodal zone dimensions. The preceding subject matter of this paragraph characterizes example 19 of the present disclosure.

The power output criterion includes a sound pressure level of at least 173 decibels at a focal point. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Figure 1:
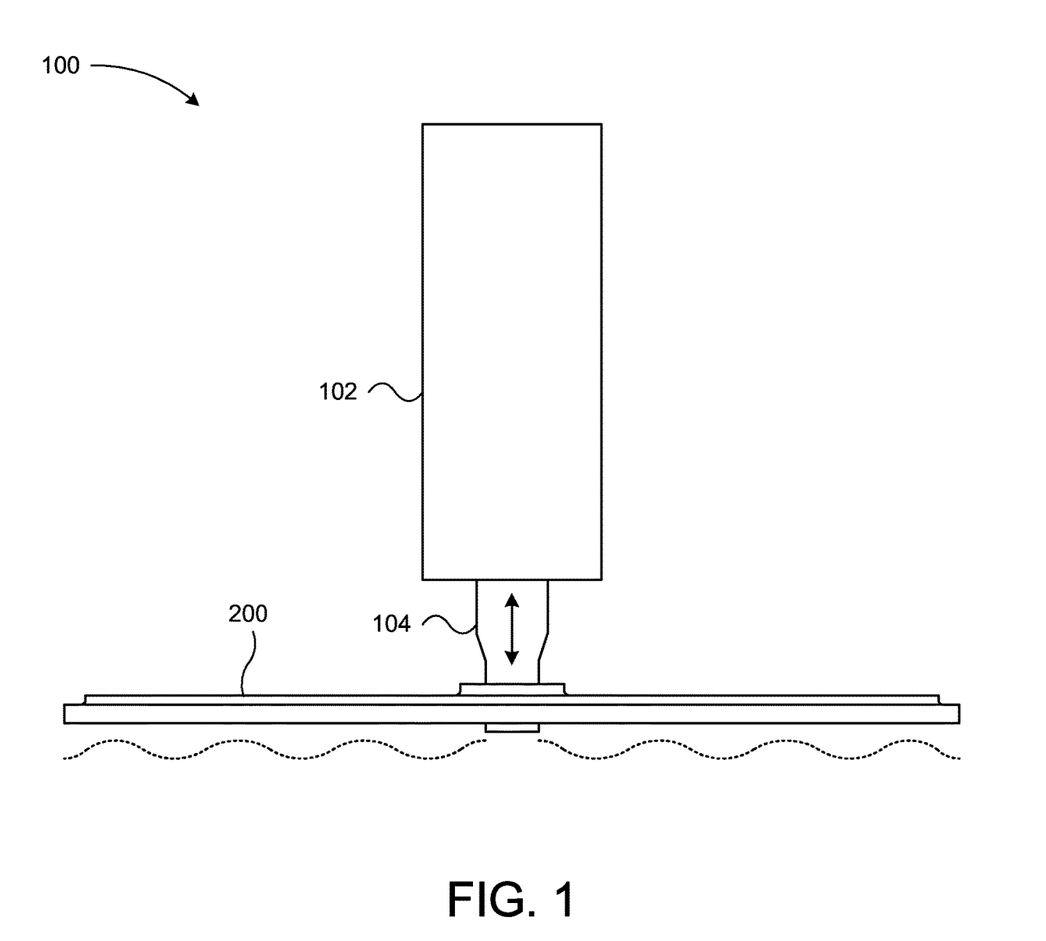
FIG. 1 is a side view of a system for ultrasound emission, including an apparatus for ultrasound emission, according to one or more embodiments of the present disclosure.

Referring to FIG. 1, a side view of a system 100 for ultrasound emission is shown. In some embodiments, the system 100 includes an ultrasonic transducer 102, a vibrating mass 104, and a plate 200. The plate 200 may also be referred to as an ultrasound emitter or an apparatus for ultrasound emission.

The ultrasonic transducer 102 produces ultrasonic vibrations. Ultrasonic vibrations, in various embodiments, may be mechanical vibrations with frequencies at or above 18 kilohertz (kHz). Such vibrations may be physically similar to sound, but inaudible to (many) humans. Vibrations at some ultrasonic frequencies may be audible to at least some humans but may nevertheless be referred to as ultrasonic. Similarly, vibrations at some frequencies near but not above 18 kHz (e.g., at 17.5 kHz) may be produced by an ultrasonic transducer 102 and may still be referred to as ultrasonic. Other ultrasonic vibrations may be at frequencies above 18 kHz (e.g., 20 kHz or higher, into hundreds of kilohertz, or into the megahertz or gigahertz ranges) and may be well outside the range of typical human perception.

An ultrasonic transducer 102 may be, or may include, any device that produces ultrasonic vibrations, such as a piezoelectric transducer, a capacitive transducer, a magnetostrictive transducer, or the like. An ultrasonic transducer 102 may produce ultrasonic vibrations in response to an ultrasonic-frequency electrical signal. The ultrasonic transducer 102 may include a power supply and signal generator to produce the ultrasonic-frequency electrical signal, or may receive the ultrasonic-frequency electrical signal from an external source.

The vibrating mass 104 is coupled to the ultrasonic transducer 102 and to the plate 200. A vibrating component of the ultrasonic transducer 102, such as a piezoelectric crystal, may be coupled to or in contact with the vibrating mass 104, which may in turn conduct the ultrasonic vibrations to another component such as the plate 200. In the illustrated embodiment, the vibrating mass 104 vibrates in a vertical direction, up and down, as indicated by arrows in FIG. 1. In one embodiment, a vibrating mass 104 may be, or may include, a fixed component of a commercially available ultrasonic transducer 102. In another embodiment, a vibrating mass 104 may be, or may include, a component that is not part of the ultrasonic transducer 102, but that is coupled to the ultrasonic transducer 102.

The vibrating mass 104 may be shaped to resonate at a frequency matching the frequency of the ultrasonic vibrations produced by the transducer 102. In some embodiments, the vibrating mass 104 may be a booster or horn, shaped to amplify or reduce the amplitude of ultrasonic vibrations produced by the transducer 102. In another embodiment, the vibrating mass 104 may have unitary gain.

The vibrating mass 104 is coupled to the center of the plate 200, and transmits the ultrasonic vibrations produced by the transducer 102 to the plate 200. The plate 200 provides a coupling between the medium into which the vibrations are to be emitted and the transducer 102 that produces the vibrations. In the depicted embodiment, the plate 200 is circular. In another embodiment, a plate 200 may be square, rectangular, or another shape, and may still emit ultrasonic vibrations into a medium. The size or surface area of the vibrating mass 104 or of vibrating components of the transducer 102 may not produce large sound pressure levels in a medium such as air, another gas, or a liquid. The plate 200 provides a larger surface area to displace greater volumes of the medium, thus emitting ultrasonic vibrations into the medium at a higher sound pressure level than a transducer 102 in the absence of the plate 200. Emitting ultrasonic vibrations into a medium such as air may facilitate air-coupled defoaming, air-coupled non-destructive inspection, or the like.

The vibrating mass 104 driving up-and-down vibrations at the center of the plate 200 may produce transverse vibrations in the plate 200. At a resonant frequency for the plate 200, vibration of the vibrating mass 104 may produce transverse standing waves in the plate 200. The plate 200 may have multiple resonance modes at different frequencies, where standing waves with different numbers of nodes and antinodes are produced in the plate 200 at the different resonant frequencies. For a circular plate 200, resonance modes may include concentric circular resonance modes where nodes (or regions of minimum displacement) of standing waves form concentric circles. For a square or rectangular plate 200, resonance modes may include linear resonance modes where waves travel in one direction (e.g., parallel to the long side of a rectangular plate 200), and where nodes form lines in the other direction (e.g., parallel to the short side of a rectangular plate 200). Similarly, a plate 200 of another shape may have a resonance mode with nodes that can be determined based on classical vibration theory. In FIG. 1, the plate 200 is circular, and vibration of the plate 200 in a transverse circular standing wave is indicated by a dashed, wavy line. The plate 200 vibrates in a circular resonance mode with nodes (points of zero displacement) at seven different radii, which may be referred to as a resonance mode with seven nodes. In another embodiment, a plate 200 may vibrate in a resonance mode with more or fewer than seven nodes.

One problem associated with design of a plate 200 as an ultrasound emitter is that vibrations from different regions of the plate 200 may destructively interfere in air (or another medium). Accordingly, one or both emitting surfaces of a plate 200 (such as the top and/or bottom surfaces) may be shaped based on expected interference. For example, a surface of the plate 200 may be shaped to produce constructive interference at a focal point, a column of coherent vibrations, to minimize or reduce emissions on one side of the plate 200, to maximize or increase emissions on another side of the plate, or the like. The plate 200 may include steps, grooves, or other thickness variations on one or both emitting surfaces of the plate 200. For example, in the side view of FIG. 1, regions of three different heights are visible from the side of the plate 200. Additional regions of different heights are not visible from the side, but are depicted in the cross section view of FIG. 3. Design of a plate 200 including zones of different heights is described in further detail below with reference to subsequent Figures.

Further problems associated with design of a plate 200 as an ultrasound emitter include the possibility of fatigue failure. At ultrasonic frequencies, rapid loading and unloading of internal stresses in the plate 200 may rapidly cause cracks or other fatigue failure. Fatigue failure may take ultrasonic cleaning, defoaming, or non-destructive inspection equipment out of production, or may involve replacement of expensively machined parts. Conversely, avoiding fatigue failure may involve limiting the sound pressure level produced by the plate 200. However, ultrasonic cleaning, inspection, or other uses of ultrasound may be more effective at higher sound pressure levels. For example, at sound pressure levels of approximately 173 dB (relative to a standard 20 micropascal reference sound pressure), ultrasonic vibrations in air may include pressure minimums low enough that de-foaming or non-destructive testing will yield good results. At lower sound pressure levels, ultrasonic vibrations in air may not adequately remove foam or may produce inadequate non-destructive testing results.

The subject matter of the present application has been developed to provide an ultrasound emitter and associated design method and computer program product that overcome at least some of the above-discussed shortcomings of previous ultrasound emitter designs, such as the above-discussed interference or fatigue problems, which have not yet been fully solved by the currently available techniques. The ultrasound emitter described herein, and the associated design method, can provide greater power output and/or durability compared to previous ultrasound emitter designs.

Figure 2:
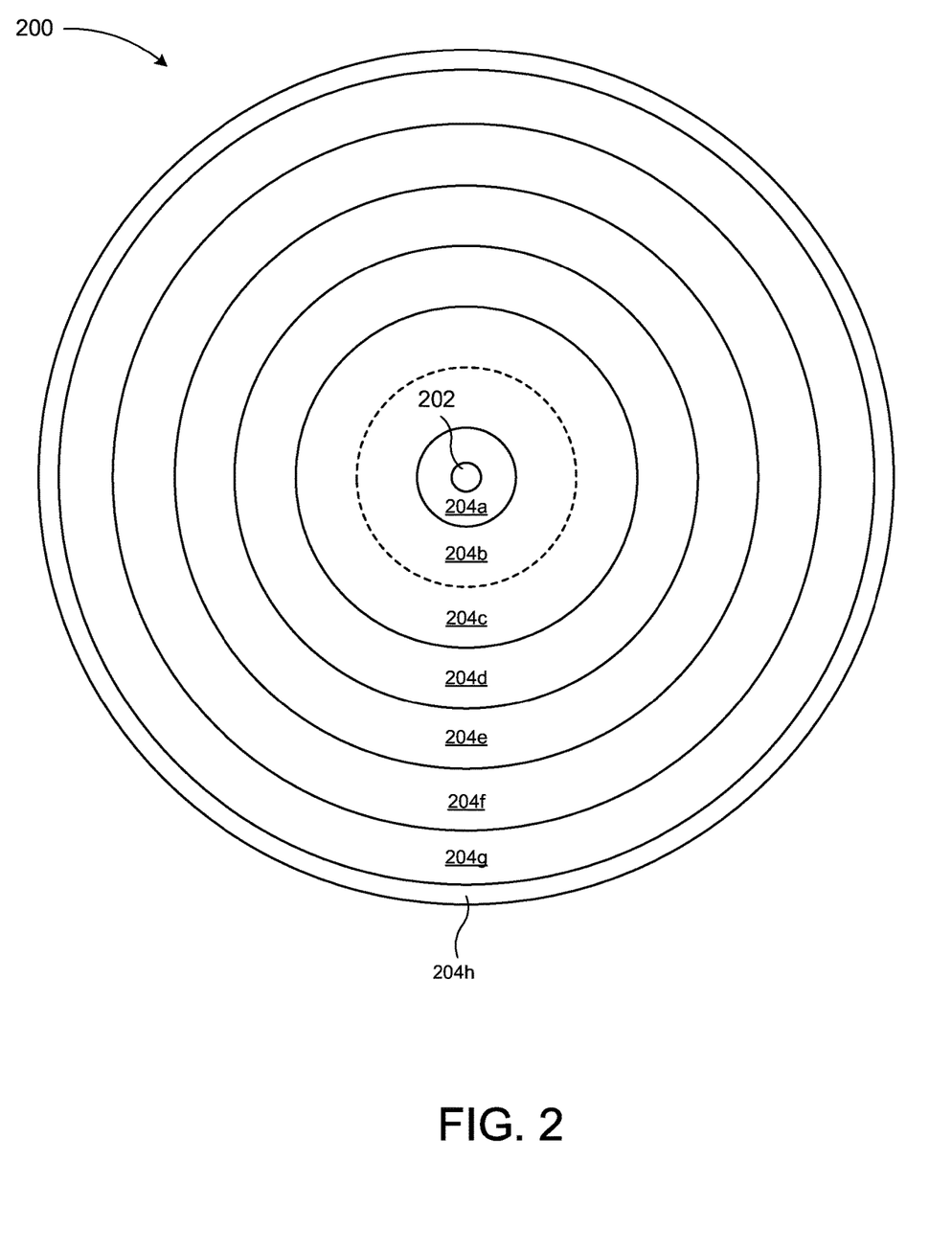
FIG. 2 is a top view of an apparatus for ultrasound emission, according to one or more embodiments of the present disclosure.
Figure 3:
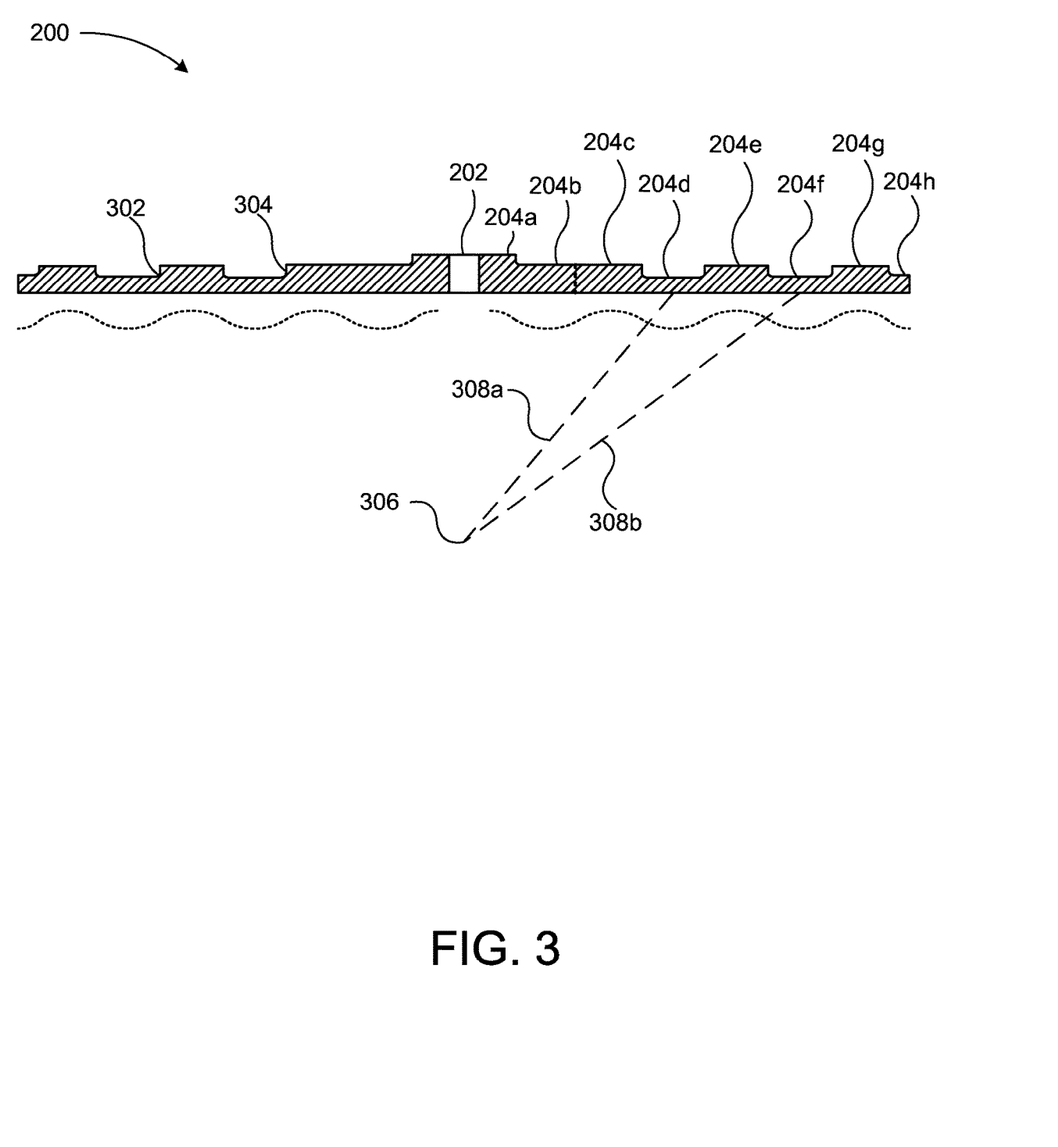
FIG. 3 is a cross section view of an apparatus for ultrasound emission, according to one or more embodiments of the present disclosure.

FIGS. 2 and 3 further illustrate a plate 200 as an ultrasound emitter, according to one or more embodiments of the present disclosure. The plate 200 may be substantially as described above with reference to FIG. 1. FIG. 2 illustrates a top view of the plate 200, and FIG. 3 illustrates a cross section taken across a diameter of the plate 200, viewed from the side. In the depicted embodiment, the plate 200 is circular. In another embodiment, a plate 200 may be square, rectangular, or another shape, and may still emit ultrasonic vibrations into a medium.

In some embodiments, the plate 200 includes or is made from a titanium alloy, such as solution treated and aged Ti-6A1-4V, or another titanium alloy. In another embodiment, the plate 200 may be made from another material with high fatigue resistance, such as steel or other ferrous alloys, aluminum, a composite material, or the like. A material for forming the plate 200 may be selected based on a property relating to fatigue endurance, such as a yield strength, a fatigue endurance limit, or the like. In general, higher sound pressure levels are associated with greater displacement amplitudes in the plate 200, and with greater internal stresses in the plate. Selecting a material with a high yield strength or fatigue endurance limit may facilitate designing a plate 200 (using the methods described below with reference to FIGS. 4 and 5) that satisfies power output and durability criteria. Alternatively, a material may be selected for the plate 200 based on other considerations such as the cost of the material, and a durability criterion for designing the plate 200 may be based on material properties of the selected material.

For some plates 200, materials may be selected based on a target resonant frequency or frequency range, such as a frequency range for a selected purpose (e.g., ultrasonic cleaning and non-destructive inspection may be associated with different ultrasonic frequencies), or a range of frequencies that a selected transducer 102 is capable of producing.

The depicted circular plate 200 with 7 nodes has a diameter of approximately 23 inches, a maximum thickness (at internodal zone 204a) of one inch, and a minimum thickness (at internodal zone 204d) of approximately 0.4 inches. In another embodiment, a plate 200 with more or fewer nodes at the same resonant frequency may have a larger or smaller diameter, respectively. Alternatively, at a lower or higher target resonant frequency, a plate 200 with the same number of nodes may have a larger or smaller diameter, respectively. A range of thicknesses for the plate 200 may be determined (e.g., in a design method as described with reference to FIG. 4 or FIG. 5) based on a selected material, durability criterion, and power output criterion. For example, a too-thin plate 200 may be prone to fatigue fracture, but a too-thick plate may be too rigid to achieve desired displacements and/or sound pressure levels.

The plate 200 is formed with a central hole 202 for coupling to the vibrating mass 104. A bolt or similar fastener may be inserted through the hole 202 to fasten the plate 200 to the vibrating mass 104. The plate 200 includes a plurality of internodal zones 204a-g. In general, nodes and antinodes may be points of zero displacement and points of maximum displacement, respectively, in a standing wave. (Displacement amplitudes are described herein with reference to absolute values: a point of maximum displacement may have a large negative displacement, while a point of minimum displacement refers to a minimum-magnitude displacement, not to the most negative displacement). More specifically, with reference to a circular resonance mode for a circular plate 200, a node may be a radius of minimum displacement, and an antinode may be a radius of maximum displacement. The internodal zones 204 are regions of the plate 200 at radii between or bounded by the nodes. Similarly, with reference to a resonance mode for a square or rectangular plate, a node may be a line or contour of minimum displacement extending across the plate (e.g., across the short dimension of a rectangular plate), and internodal zones 204 may be regions of the plate 200 bounded by the nodes.

Nodes are indicated by solid or dashed circular lines in FIG. 2. In the depicted embodiment, the bottom of the plate 200 is flat, and internodal zones 204 have different heights relative to the bottom of the plate 200. In another embodiment, the plate 200 may not include a flat side. For example, the bottom of the plate 200 may be stepped or grooved. Dimensions of internodal zones 204 may include heights at a top surface and at a bottom surface, or may simply include heights for one surface of the plate 200 relative to a flat second surface. Steps 304 at boundaries between internodal zones 204, as illustrated in FIG. 3, result where adjacent internodal zones 204 have different heights. Stepped internodal zone boundaries are indicated by solid lines in FIG. 2. However, some pairs of adjacent internodal zones 204 may be of equal height, resulting in no step 304. An unstepped boundary between internodal zones 204 is indicated by a dashed line between internodal zone 204b and internodal zone 204c in FIGS. 2 and 3. Although one unstepped internodal zone boundary is illustrated, another embodiment of a plate 200 may include more or fewer than one unstepped internodal zone boundaries.

Vibration of the plate 200 in a transverse standing wave is indicated by a dashed, wavy line in FIG. 3, as in FIG. 1. It may be seen that the nodes (indicated by steps 304 or by the dashed line between internodal zone 204b and internodal zone 204c) are radiuses, lines, or contours of minimum displacement amplitude, and that the internodal zones 204 include the antinodes or contours of maximum displacement amplitude.

In a resonance mode for the plate 200, points in the internodal zones 204 may generally be displaced upwards and downwards at different points in time. At any given point in time, however, points in one internodal zone 204 may be displaced in the same direction as each other, while points in an adjacent internodal zone 204 are displaced in the opposite direction. Displacement of adjacent internodal zone 204 in opposite directions may result in destructive interference of ultrasonic waves in the medium. The steps 304, in some embodiments, may offset the oppositely vibrating regions to emit a column of coherent (rather than destructively interfering) waves from the stepped side of the plate 200.

Additionally, a surface of the plate 200 may be configured so that different path lengths 308a-b from different internodal zones 204 results in constructive interference at a focal point 306. In the depicted embodiment, the flat surface of the plate 200 emits vibrations that constructively interfere at a focal point. In another embodiment, path lengths 308 from different regions or internodal zones 204 of the plate 200 to a focal point 306 may be adjusted to produce constructive interference, by making a surface of the plate 200 grooved, stepped, dished, or the like.

A plate 200 including steps 304 may also include interior corners 302 where the top of a lower internodal zone 204 meets the side of a higher internodal zone 204. Internal stresses caused by ultrasonic vibrations may be concentrated at sharp corners, which may be likely places for fatigue cracks to begin. Accordingly, interior corners 302 may be rounded, beveled, or filleted to distribute internal stresses and avoid fatigue failures.

A plate 200 as disclosed herein may be designed and manufactured according to a method (as disclosed below with regard to FIGS. 4 and 5) that uses topology optimization to determine internodal zone dimensions. Designing a plate 200 using topology optimization may provide greater power output and/or durability compared to previous ultrasound emitter designs.

Figure 4:
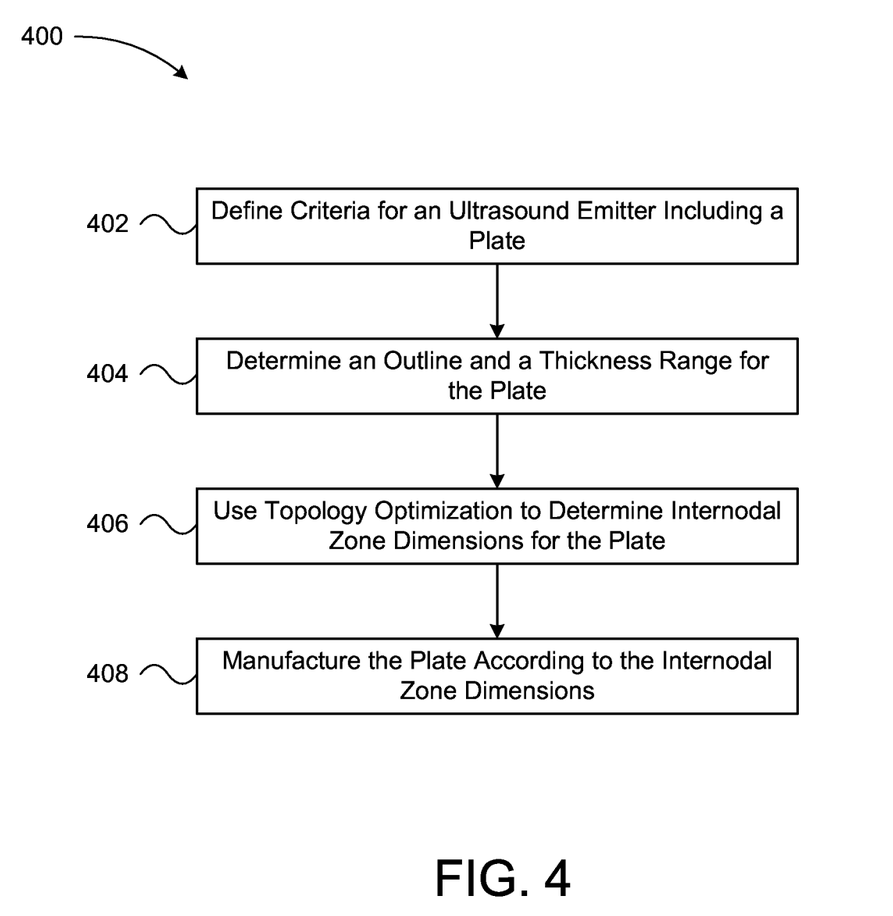
FIG. 4 is a flowchart of a method of producing an ultrasound emitter, according to one or more embodiments of the present disclosure.
Figure 5:
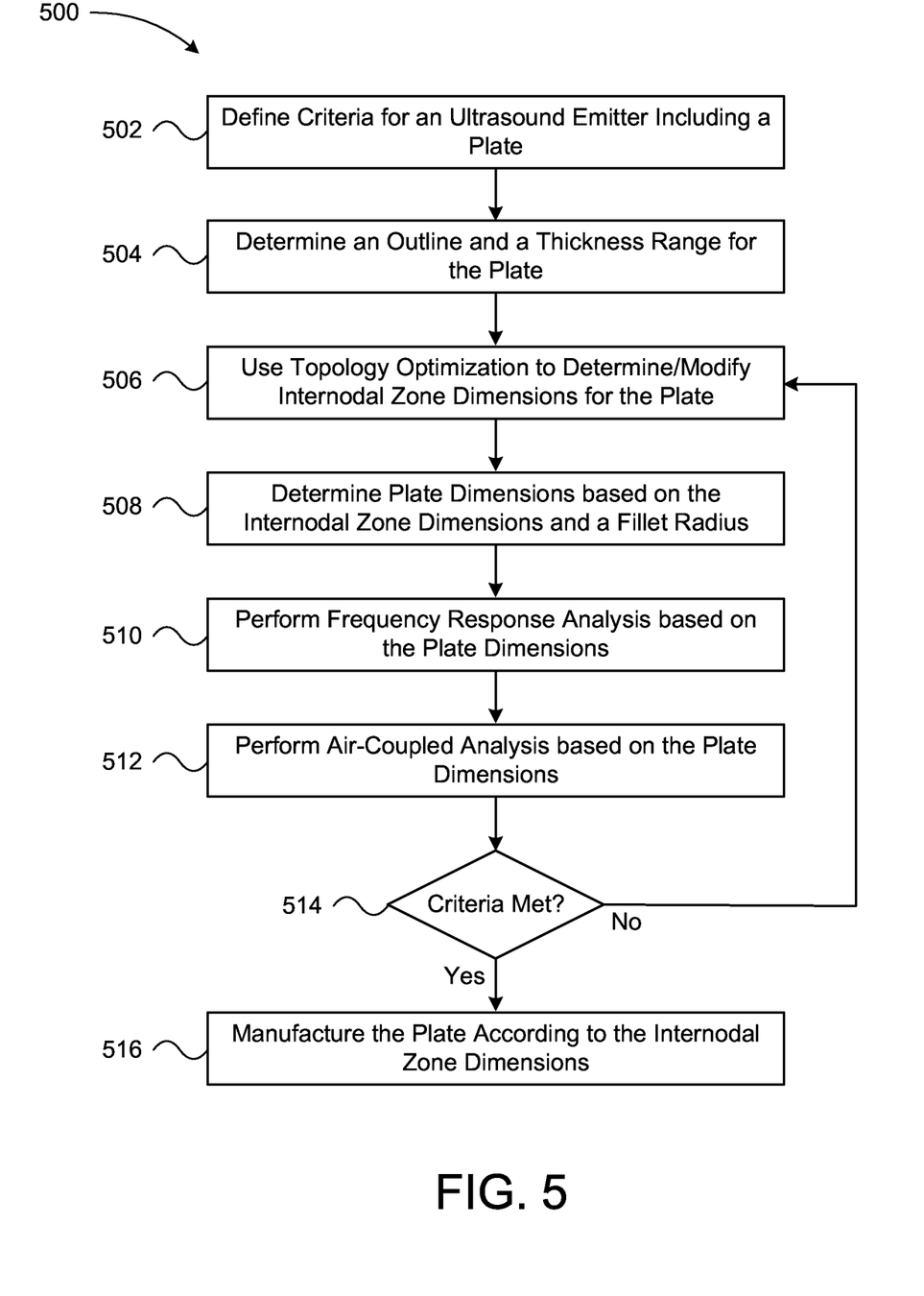
FIG. 5 is a flowchart of a method of producing an ultrasound emitter, according to one or more embodiments of the present disclosure.

FIGS. 4 and 5 are flowcharts illustrating methods for producing an ultrasound emitter (e.g., the plate 200). In some embodiments, the methods disclosed herein may be performed at least in part in part by a computer processor, which may execute code that includes instructions for performing steps of the methods. Program code may be embodied in a computer readable storage medium which may include memory or storage such as random access memory, non-volatile memory/storage, magnetic storage, or the like A computer readable storage medium does not include transitory signals per se such as electromagnetic waves.

Referring to FIG. 4, a method 400 of making an ultrasound emitter is shown. The method 400 includes defining 402 a set of criteria for an ultrasound emitter comprising a plate 200. A criterion may be a minimum, a maximum, a range, a target or another point of reference that specifies or pertains to some aspect of the plate 200 such as a focal distance, a resonant frequency, or the like. A set of criteria may include at least one criterion. In some embodiments, defining 402 a set of criteria may include obtaining one or more criteria from a person or organization who will use the plate 200 as an ultrasound emitter. A person or organization may specify criteria via a software interface, a web page, or the like. Criteria, in some embodiments, may pertain to an intended application of the plate 200. For example, different resonant frequency criteria may be defined for cleaning and for non-destructive inspection. Some criteria may be defined based on default values. For example, if properties relating to durability of the plate 200 are not specified by the user, a durability criterion may be defined for the plate 200 based on a default that provides reasonable durability for a target range of ultrasonic frequencies.

The set of criteria includes a power output criterion, a frequency criterion and number of nodes for a resonance mode of the plate 200, a focus criterion, and a durability criterion. A power output criterion may be any criterion relating to power output of ultrasonic waves emitted by the plate 200, such as a target power output or sound pressure level, a desired power or sound pressure level range, or the like. In one embodiment, a power output criterion may include a desired sound pressure level of at least 173 dB at a focal point 306. In another embodiment, a power output criterion may include a desired sound pressure level of at least 175 dB, 170 dB, 180 dB, 185 dB, or the like at a focal point 306, or may include another power or sound pressure level target or range.

A frequency criterion may include a target resonant frequency for the plate 200, a range of frequencies available from the transducer 102, or the like. In one embodiment, for ultrasonic cleaning, a frequency criterion may include a resonant frequency in a range from 19.8 kHz to 20.2 kHz, inclusive. (E.g., the criterion may be that the resonant frequency is in the target range). Transducers 102 may be available in at various frequencies in a range from 19 kHz to 50 kHz, and may be tunable around a target frequency in that range. For example, a transducer 102 may have a nominal frequency of 20 kHz, 30kHz, 40 kHz, or 50 kHz, and may be tunable in a range of plus or minus 200 Hz (or another range) around the nominal frequency. A frequency criterion may include a range of frequencies available from the transducer 102 that the plate 200 will be used with, such as a range from 29.8 kHz to 30.2 kHz for a 30 kHz transducer 102, a range from 39.8 kHz to 40.2 kHz for a 40 kHz transducer 102, or a range from 49.8 kHz to 50.2 kHz for a 50 kHz transducer 102. In another embodiment, for ultrasonic non-destructive inspection, a frequency criterion may include a resonant frequency in a range from 200 kHz to 400 kHz, inclusive. A number of nodes for a resonance mode of the plate 200 may be a target number of nodes, a minimum number of nodes, a maximum number of nodes, or may be specified by a related number such as a number of internodal zones 204.

A focus criterion may include information relating to the existence or position of a focal point 306, such as a target focal distance or range, a minimum focal distance, a maximum focal distance, or whether a focal point 306 is to exist (alternatively, a surface of the plate 200 may emit a column of coherent ultrasonic vibrations that do not focus to a point). A durability criterion may be any criterion relating to durability or fatigue resistance of the plate 200, and may include a material for the plate 200, a property of a material such as an ultimate tensile strength ($F_{tu}$), a yield strength ($F_{ty}$), a maximum stress (which may, in some embodiments be a percentage of the yield strength, or otherwise based on the yield strength), an endurance limit (e.g., a known stress limit for a material below which fatigue failure does not occur for a high or indefinite number of loading cycles).

In some embodiments, the plate 200 includes a titanium alloy, such as solution treated and aged Ti-6A1-4V, or another titanium alloy, and a durability criterion is based on a yield strength of the titanium alloy. For example, the durability criterion may be a maximum stress of 20% of the yield strength, 30% of the yield strength, 50% of the yield strength, or the like. In another embodiment, the plate 200 may be made from another material with high fatigue resistance, such as steel or other alloys, aluminum, a composite material, or the like, and the durability criterion may be based on the fatigue resistance of that material The method 400 includes determining 404 an outline and a thickness range for the plate 200, based on the set of criteria. Determining 404 an outline may include selecting (or receiving a user selection of) a whether the plate 200 is to have an outline that is circular, square, rectangular, or the like, and using classical vibration theory to identify one or more parameters of the outline, such as a diameter for a circular plate, a length of a side for a square plate, a length and width of a rectangular plate, or the like. Using classical vibration theory, one or more parameters of the outline may be identified as consistent with the frequency criterion, the number of nodes, and the speed of sound in a material consistent with the durability criterion. A thickness range may include a minimum and maximum thickness, or may be an open-ended range defined by a minimum thickness. In some embodiments, a minimum or lower bound of a thickness range may be based on a selected material for the plate 200 and on the durability criterion: a too-thin plate 200 may be prone to fatigue fracture. In some embodiments, a maximum or upper bound of a thickness range may be based on a power output criterion (e.g., a too-thick plate 200 may be too rigid to achieve desired displacements and/or sound pressure levels) or may be based on other factors such as a weight limit for the plate 200, a target for low mass, a cost limit for plate materials, or the like. A thickness range may define design limits for subsequent steps of the method 400. However, individual internodal zones 204 of the plate 200 may have different dimensions or thicknesses as described above with reference to FIGS. 1 through 3.

The method 400 includes using 406 topology optimization to determine internodal zone dimensions for the plate 200, based on the set of criteria, the outline, and the thickness range. Topology optimization includes methods of determining design of an object within a design space of acceptable parameters, based on one or more objectives to minimize or maximize, and one or more constraints. A variety of methods for evaluating a design or modifying design parameters to optimize topology are available. Commercially available software for topology optimization includes software provided under the OptiStruct trademark.

Using 406 topology optimization to determine internodal zone dimensions may include defining constraints such as a resonant frequency or frequency range based on the frequency criterion, a vibration amplitude or amplitude range, a maximum stress based on the durability criterion, a maximum phase difference between two points on the plate 200 based on a focus criterion (e.g., to ensure that vibrations are in-phase for coherence, or in-phase at a focal point 306). Node locations may be determined based on classical vibration theory, and specified as constraints. Constraints for topology optimization may also include the thickness range, where upper and lower thickness limits for an internodal zone 204 define a design space for the thickness of the internodal zones 204.

Objectives for topology optimization may include reducing mass of the plate 200, increasing power output, increasing vibration displacement at one or more points, or the like. In certain embodiments, internal stresses may be largest at or near vibration displacement maximums, and increasing the vibration displacement at lower-amplitude antinodes may increase power output without increasing the maximum internal stresses. Thus, objectives for topology optimization may include increasing vibration displacement at lower-amplitude antinodes, producing more uniform vibration displacement across multiple antinodes, or the like. In one embodiment, using 406 topology optimization to determine the internodal zone dimensions may include reducing a mass for the plate 200 and increasing a displacement for at least one internodal zone 204, relative to the corresponding mass and displacement of a flat-plate model (e.g., a plate 200 with two flat surfaces and uniform internodal zone heights.)

Using 406 topology optimization to determine internodal zone dimensions may include determining heights of internodal zones 204 at one surface of the plate 200, relative to a flat surface. The internodal zone heights may define steps 304 at some or all of the internodal zone boundaries. However, in some embodiments, some, all, or none of the internodal zone boundaries may be unstepped. In some embodiments, determining internodal zone dimensions may include determining step heights, groove depths, or the like for both surfaces of the plate 200, relative to a baseline height or thickness.

With the node radii or contours determined based on classical vibration theory and internodal zone dimensions determined based on topology optimization, the method 400 includes manufacturing 408 a plate 200 according to the internodal zone dimensions. In computer implementations of the method 400, manufacturing 408 the plate 200 may include computer-aided manufacturing. In another embodiment, manufacturing 408 the plate 200 may include providing dimensions to a machinist to machine the plate 200.

Referring to FIG. 5, a method 500 of making an ultrasound emitter is shown. The method 500 includes defining 502 a set of criteria for an ultrasound emitter comprising a plate 200, determining 504 an outline and a thickness range for the plate 200, and using 506 topology optimization to determine internodal zone dimensions, which may be substantially as described above with reference to FIG. 4.

The method 500 includes determining 508 plate dimensions based on the internodal zone dimensions and a fillet radius for interior corners 302. Plate dimensions may include node locations and internodal zone dimensions as described above, but may also include additional dimensions such as a fillet radius for internal corners 302, a radius or bevel to avoid sharp external corners. Filleting interior corners 302 may avoid fatigue fractures, but may also cause the plate 200 to violate the criteria that were used as constraints for the topology optimization. Accordingly, the method 500 includes performing 510 frequency response analysis based on the plate dimensions to determine whether the plate dimensions meet the frequency criterion and the durability criterion.

Performing 510 frequency response analysis may include using finite element analysis or similar methods to model or determine stresses, displacements, or the like in the plate 200 in response to an applied vibration frequency or a range of applied frequencies from the transducer 102. Performing 510 frequency response analysis may determine whether a frequency criterion such as a target resonant frequency or range is met, and whether a durability criterion such as a maximum stress is met. Frequency response analysis may be performed 510 prior to manufacturing 516 the plate 200, so that manufacturing expense is avoided if the criteria are not met.

The method 500 includes performing 512 air-coupled analysis based on the plate dimensions, to determine whether the plate dimensions meet the power output criterion and the focus criterion. Performing 512 air-coupled analysis may include using finite element analysis or other known computational fluid dynamics methods to model ultrasonic vibrations emitted by the plate 200 into the surrounding air (or another medium). Performing 512 air-coupled analysis may determine whether a power criterion such as a target sound pressure level is met, whether a focus criterion such as a focal distance is met, or the like. Air-coupled analysis may be performed 512 prior to manufacturing 516 the plate 200, so that manufacturing expense is avoided if the criteria are not met.

The method 500 includes determining 514 whether the criteria in the set of criteria are met. In response to determining 514 that the plate dimensions meet the criteria, the method 500 includes manufacturing 516 the plate 200 according to the internodal zone dimensions and other plate dimensions. Manufacturing 516 the plate 200 may be substantially as described above with response to FIG. 4.

Conversely, in response to determining 514 that at least one of the criteria is unmet, the method 500 includes iteratively using 506 topology optimization to modify internodal zone dimensions, performing 510 frequency response analysis, and performing 512 air-coupled analysis until the plate dimensions meet the criteria. Once the criteria are met, the method 500 includes manufacturing 516 the plate 200.

In the above description, certain terms may be used such as "up," "down," "upper," "lower," "horizontal," "vertical," "left," "right," "over," "under" and the like. These terms are used, where applicable, to provide some clarity of description when dealing with relative relationships. However, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of producing an ultrasound emitter, comprising:
    defining a set of criteria for an ultrasound emitter comprising a plate, the set of criteria comprising a power output criterion, a frequency criterion and number of nodes for a resonance mode of the plate, a focus criterion, and a durability criterion;
    selecting a material, based on the set of criteria;
    determining an outline and a thickness range for the plate, based on the set of criteria and the material selected;
    using topology optimization to determine internodal zone dimensions for the plate, based on the set of criteria, the outline, and the thickness range;
    providing the material; and
    modifying the shape of the material to have a thickness within the thickness range, to have the outline, and to have intermodal zones having the internodal zone dimensions.

2. The method of claim 1, further comprising:
    determining plate dimensions based on the internodal zone dimensions and a fillet radius for interior corners; and
    performing frequency response analysis based on the plate dimensions to determine whether the plate dimensions meet the frequency criterion and the durability criterion, prior to modifying the shape of the material.

3. The method of claim 2, further comprising performing air-coupled analysis based on the plate dimensions to determine whether the plate dimensions meet the power output criterion and the focus criterion, prior to modifying the shape of the material.

4. The method of claim 3, wherein manufacturing the plate is in response to determining that the plate dimensions meet the criteria.

5. The method of claim 3, wherein, in response to determining that at least one of the criteria is unmet, the method comprises iteratively using topology optimization to modify internodal zone dimensions, performing frequency response analysis, and performing air-coupled analysis until the plate dimensions meet the criteria.

6. The method of claim 1, wherein the material comprises a titanium alloy and the durability criterion is based on a yield strength for the titanium alloy.

7. The method of claim 1, wherein using topology optimization to determine the internodal zone dimensions comprises reducing a mass for the plate and increasing a displacement for at least one internodal zone, compared to a flat-plate model.

8. The method of claim 1, wherein the power output criterion comprises a sound pressure level of at least 173 decibels at a focal point.

9. The method of claim 1, wherein the frequency criterion comprises a resonant frequency in a range from 19.8 kHz to 20.2 kHz, inclusive.

10. The method of claim 1, wherein the frequency criterion comprises a resonant frequency in a range from 200 kHz to 400 kHz, inclusive.

11. The method of claim 1, wherein the internodal zone dimensions comprise internodal zone heights defining steps at internodal zone boundaries.

12. A computer program product for producing an ultrasound emitter, the computer program product comprising a computer readable storage medium having program code embodied therein, the program code readable/executable by a processor for:
    defining a set of criteria for an ultrasound emitter shaped as a plate, the set of criteria comprising a power output criterion, a frequency criterion and number of nodes for a resonance mode of the plate, a focus criterion, and a durability criterion;
    selecting a material, based on the set of criteria;
    determining an outline and a thickness range for the plate, based on the criteria and the material selected;
    using topology optimization to determine internodal zone dimensions for the plate, based on the criteria, the outline, and the thickness range; and
    modifying the shape of a piece of the material to have a thickness within the thickness range, to have the outline, and to have internodal zone having the internodal zone dimensions.

13. The computer program product of claim 12, wherein the program code is further configured for:
    determining plate dimensions based on the internodal zone dimensions and a fillet radius for interior corners; and
    performing frequency response analysis based on the plate dimensions to determine whether the plate dimensions meet the frequency criterion and the durability criterion, prior to modifying the shape of the piece of the material.

14. The computer program product of claim 13, wherein the program code is further configured for performing air-coupled analysis based on the plate dimensions to determine whether the plate dimensions meet the power output criterion and the focus criterion, prior to modifying the shape of a piece of the material.

15. The computer program product of claim 14, wherein the program code is configured for manufacturing the plate in response to determining that the plate dimensions meet the criteria.

16. The computer program product of claim 14, wherein the program code is configured, in response to determining that at least one of the criteria is unmet, for iteratively using topology optimization to modify internodal zone dimensions, performing frequency response analysis, and performing air-coupled analysis until the plate dimensions meet the criteria.

17. The computer program product of claim 12, wherein the material comprises a titanium alloy and the durability criterion is based on a yield strength for the titanium alloy.

18. The computer program product of claim 12, wherein using topology optimization to determine the internodal zone dimensions comprises reducing a mass for the plate and increasing a displacement for at least one internodal zone, compared to a flat-plate model.

19. An apparatus for ultrasound emission, comprising:
    a plate produced by the method of:
        defining a set of criteria for an ultrasound emitter comprising a plate, the set of criteria comprising a power output criterion, a frequency criterion and number of nodes for a resonance mode of the plate, a focus criterion, and a durability criterion;
        determining an outline and a thickness range for the plate, based on the set of criteria;
        using topology optimization to determine internodal zone dimensions for the plate, based on the set of criteria, the outline, and the thickness range; and
        manufacturing the plate according to the internodal zone dimensions.

20. The apparatus of claim 19, wherein the wherein the power output criterion comprises a sound pressure level of at least 173 decibels at a focal point.

* * * * *